United States Patent
Ikeda et al.

(10) Patent No.: US 11,326,034 B2
(45) Date of Patent: May 10, 2022

(54) METHOD FOR MANUFACTURING POLYTETRAFLUOROETHYLENE FORMED PRODUCT, AND POLYTETRAFLUOROETHYLENE FORMED PRODUCT

(71) Applicants: SUMITOMO ELECTRIC FINE POLYMER, INC., Osaka (JP); DAIKIN INDUSTRIES, LTD., Osaka (JP)

(72) Inventors: Kazuaki Ikeda, Osaka (JP); Hong-Phuc Nguyen, Osaka (JP); Hirotoshi Yoshida, Settsu (JP); Taku Yamanaka, Settsu (JP)

(73) Assignees: SUMITOMO ELECTRIC FINE POLYMER, Osaka (JP); DAIKIN INDUSTRIES, LTD., Osaka (JP)

( * ) Notice: Subject to any disclaimer, the term of this patent is extended or adjusted under 35 U.S.C. 154(b) by 374 days.

(21) Appl. No.: 15/757,708

(22) PCT Filed: Aug. 30, 2016

(86) PCT No.: PCT/JP2016/075327
§ 371 (c)(1),
(2) Date: Mar. 6, 2018

(87) PCT Pub. No.: WO2017/043372
PCT Pub. Date: Mar. 16, 2017

(65) Prior Publication Data
US 2019/0040218 A1   Feb. 7, 2019

(30) Foreign Application Priority Data
Sep. 7, 2015   (JP) .............................. JP2015-176199

(51) Int. Cl.
| C08J 7/12 | (2006.01) |
| C08J 3/28 | (2006.01) |
| C08J 3/24 | (2006.01) |
| C23C 24/08 | (2006.01) |
| C23C 26/00 | (2006.01) |
| C09D 127/18 | (2006.01) |
| B29C 48/00 | (2019.01) |
| B29C 35/08 | (2006.01) |
| B29C 45/00 | (2006.01) |
| C08F 14/26 | (2006.01) |
| B29K 27/18 | (2006.01) |

(52) U.S. Cl.
CPC ........... C08J 7/123 (2013.01); B29C 35/0866 (2013.01); B29C 45/0001 (2013.01); B29C 48/022 (2019.02); C08F 14/26 (2013.01); C08J 3/24 (2013.01); C08J 3/28 (2013.01); C09D 127/18 (2013.01); C23C 24/08 (2013.01); C23C 26/00 (2013.01); B29C 2035/0872 (2013.01); B29K 2027/18 (2013.01); C08J 2327/18 (2013.01)

(58) Field of Classification Search
CPC ........................................................ C08J 7/123
See application file for complete search history.

(56) References Cited

U.S. PATENT DOCUMENTS

| 3,116,226 | A | | 12/1963 | Bowers | |
| 5,444,103 | A | * | 8/1995 | Tabata | C08J 3/28 522/156 |
| 6,204,301 | B1 | * | 3/2001 | Oshima | C08J 3/28 522/5 |
| 7,276,287 | B2 | * | 10/2007 | Smith | C08F 14/26 428/422 |
| 2005/0182216 | A1 | | 8/2005 | Morgan | |
| 2007/0015889 | A1 | | 1/2007 | Morgan | |
| 2007/0117929 | A1 | * | 5/2007 | Burch | C08F 114/26 525/199 |
| 2009/0281231 | A1 | | 11/2009 | Kasai et al. | |
| 2013/0122302 | A1 | | 5/2013 | Miyamoto et al. | |
| 2015/0082757 | A1 | * | 3/2015 | Chaen | B32B 27/322 55/482 |

FOREIGN PATENT DOCUMENTS

| CN | 1285372 A | 2/2001 |
| CN | 1714109 A | 12/2005 |
| JP | S48-078252 A | 10/1973 |
| JP | H06-116423 A | 4/1994 |
| JP | H08-339809 A | 12/1996 |
| JP | H09-278907 A | 10/1997 |
| JP | H09-316266 A | 12/1997 |

(Continued)

OTHER PUBLICATIONS

Khatipov, Sergei A., et al. "Morphology of polytetrafluoroethylene before and after irradiation." Radiation Physics and Chemistry 81.3 (2012): 256-263. (Year: 2012).*
Asano et al., JP 2003-183412 A, Machine Translation, Jul. 2003 (Year: 2003).*
Zhong Lei et al., "Thermal stability of radiation crosslinked polytetrafluoroethylene (XPTFE) in air," Radiation Research and Radiation Processing Journal, vol. 30, No. 6, Dec. 31, 2012, pp. 333-338.
Wang Chengbiao et al., "Common Knowledge Evidence: Tribological Materials and Surface Engineering, 1st edition," National Defense Industry Press, Feb. 29, 2012, p. 568.

(Continued)

*Primary Examiner* — Galen H Hauth
(74) *Attorney, Agent, or Firm* — Faegre Drinker Biddle & Reath LLP

(57) ABSTRACT

A manufacturing method for a polytetrafluoroethylene formed product according to an aspect of the invention is a manufacturing method for a polytetrafluoroethylene formed product, the method including a step of irradiating a forming material containing a polytetrafluoroethylene as a principal component with ionizing radiation, wherein the polytetrafluoroethylene has a melt viscosity at 380° C. of not greater than $7 \times 10^5$ Pa·s.

9 Claims, No Drawings

(56) References Cited

FOREIGN PATENT DOCUMENTS

| | | | |
|---|---|---|---|
| JP | H10-147617 A | | 6/1998 |
| JP | 2002-80672 A | | 3/2002 |
| JP | 2002-114882 A | | 4/2002 |
| JP | 2003-183412 A | | 7/2003 |
| JP | 2003183412 A | * | 7/2003 |
| JP | 2005-105057 | | 4/2005 |
| JP | 2013-528663 A | | 7/2013 |
| WO | WO-2005/061567 A1 | | 7/2005 |
| WO | WO-2007/119829 A1 | | 10/2007 |
| WO | WO-2013157647 A1 | * | 10/2013 ........... B29D 99/005 |

OTHER PUBLICATIONS

Sun Lvhou, "Common Knowledge Evidence: New Material and Techniques of Fine Chemical Industry, 1st edition," China Petrochemical Press, Apr. 30, 1998, p. 227.

Chinese Office Action dated Apr. 7, 2020 issued in Chinese Patent Application No. 201680051526.X, along with English-language translation.

* cited by examiner

METHOD FOR MANUFACTURING POLYTETRAFLUOROETHYLENE FORMED PRODUCT, AND POLYTETRAFLUOROETHYLENE FORMED PRODUCT

TECHNICAL FIELD

The present invention relates to a manufacturing method for a polytetrafluoroethylene formed product and a polytetrafluoroethylene formed product.

BACKGROUND ART

As means for improving the mechanical strength such as wear resistance of a polytetrafluoroethylene (PTFE), a technique to irradiate a coating film or the like of a PTFE with ionizing radiation has been known (see Japanese Laid-Open Patent Publication No. H6-116423 and Japanese Laid-Open Patent Publication No. H9-278907). In such a case of irradiation with ionizing radiation, a high-molecular weight PTFE having an average molecular weight exceeding 600 thousand is used for providing sufficient mechanical strength due to entanglement of molecules. On the other hand, for example, a low-molecular weight PTFE having a number average molecular weight of not greater than 600 thousand is used as an additive for improving slidability or the texture of a coating film surface, or the like (see Japanese Laid-Open Patent Publication No. H10-147617).

CITATION LIST

Patent Literature

PATENT LITERATURE 1: Japanese Laid-Open Patent Publication No. H6-116423
PATENT LITERATURE 2: Japanese Laid-Open Patent Publication No. H9-278907
PATENT LITERATURE 3: Japanese Laid-Open Patent Publication No. H10-147617
PATENT LITERATURE 4: Japanese Laid-Open Patent Publication No. H8-339809
PATENT LITERATURE 5: Japanese Translation of PCT International Application No. 2013-528663
PATENT LITERATURE 6: International Publication No. WO2005-061567
PATENT LITERATURE 7: International Publication No. WO2007-119829

SUMMARY OF INVENTION

Technical Problem

However, the high-molecular weight PTFE is disadvantageous in having poor formability. For example, when a PTFE is handled as powder, fibrillization occurs even due to slight shearing force, making coating by powder application very difficult. Therefore, coating with a PTFE is generally carried out using a dispersion obtained by dispersing PTFE fine particles in water. However, in this case as well, in dispersing the PTFE fine particles in water, or in mixing the PTFE fine particles with a filler or the like, fibrillization may occur. In addition, the high-molecular weight PTFE has low fluidity even in a molten state, and thus it is difficult to perform extrusion or injection forming of the high-molecular weight PTFE. Therefore, processing of the high-molecular weight PTFE is generally performed by a method of cutting out from a block body, resulting in high cost.

The present invention has been made based on the above-described circumstances, and an object of the present invention is to provide: a manufacturing method for a polytetrafluoroethylene formed product that facilitates forming and that allows a polytetrafluoroethylene formed product having excellent mechanical characteristics such as rub resistance to be obtained; and a polytetrafluoroethylene formed product obtained by such a manufacturing method.

Solution To Problem

The present inventors have found that when a coating film or the like of a PTFE having a low molecular weight, that is, a low melt viscosity, is irradiated with ionizing radiation, a coating film or the like having high mechanical strength substantially equivalent to that in the case where a high-molecular weight PTFE is used can be obtained. Furthermore, the present inventors have found that, surprisingly, regarding specific mechanical characteristics such as rub resistance, higher performance can be exerted than in the case where a high-molecular weight PTFE is used. On the basis of these findings, the present inventors have completed the present invention.

Specifically, a manufacturing method for a polytetrafluoroethylene formed product according to an aspect of the invention that has been made to solve the above problem, is a manufacturing method for a polytetrafluoroethylene formed product; the method comprising a step of irradiating a forming material containing a polytetrafluoroethylene as a principal component with ionizing radiation, wherein the polytetrafluoroethylene has a melt viscosity at 380° C. of not greater than $7 \times 10^5$ Pa·s.

A polytetrafluoroethylene formed product according to another aspect of the present invention that has been made to solve the above problem is a polytetrafluoroethylene formed product obtained by the above manufacturing method for the polytetrafluoroethylene formed product.

Advantageous Effects of Invention

According to the present invention, it is possible to provide: a manufacturing method for a polytetrafluoroethylene formed product that facilitates forming and that allows a polytetrafluoroethylene formed product having excellent mechanical characteristics such as rub resistance to be obtained; and a polytetrafluoroethylene formed product obtained by such a manufacturing method.

DESCRIPTION OF EMBODIMENTS

[Description of Embodiment of Present Invention]

A manufacturing method for a polytetrafluoroethylene (PTFE) formed product according to an aspect of the present invention is a manufacturing method for a PTFE formed product, the method including an irradiation step of irradiating a forming material containing a PTFE as a principal component with ionizing radiation under a condition of no oxygen and of a temperature equal to or higher than the crystalline melting point of the PTFE, wherein the PTFE has a melt viscosity at 380° C. of not greater than $7 \times 10^5$ Pa·s.

According to the manufacturing method, a PTFE formed product having excellent mechanical characteristics such as wear resistance can be obtained by irradiating a forming material containing, as a principal component, a PTFE having a low melt viscosity, that is, having a low molecular weight, with ionizing radiation. The obtained PTFE formed product can have high tensile strength, hardness, and the like as mechanical characteristics other than wear resistance. Furthermore, the manufacturing method uses the low-molecular weight PTFE, which has melt fluidity and does not have fibrillatability, thus facilitates forming, and can increase the productivity of a PTFE formed product, for example.

The melt viscosity is preferably not less than $1\times10^2$ Pa·s. When the melt viscosity of the PTFE to be used is not less than $1\times10^2$ Pa·s, evaporation of the PTFE and the like during irradiation with the ionizing radiation are inhibited, and thus a formed product having more excellent mechanical characteristics can be obtained, for example.

The melt viscosity is more preferably not less than $1\times10^5$ Pa·s. When the melt viscosity of the PTFE to be used is not less than $1\times10^5$ Pa·s, the mechanical characteristics of the obtained PTFE formed product can be further enhanced, for example.

The dose of the ionizing radiation is preferably not less than 10 kGy and not greater than 2000 kGy, and more preferably not less than 30 kGy and not greater than 200 kGy. When the dose of the ionizing radiation is within the above range, the mechanical characteristics and the like of the obtained PTFE formed product can be further enhanced. The reason for this is considered to be that, due to the dose within the above range, a favorable crosslinked state is formed, for example.

The polytetrafluoroethylene formed product is preferably used for a sliding member. The sliding member for which a PTFE formed product that is obtained by the manufacturing method and that has excellent mechanical characteristics is used, can exhibit high durability and the like.

The manufacturing method for the PTFE formed product preferably further includes a forming step of forming the forming material, before the irradiation step. The PTFE to be used in the manufacturing method has excellent formability as described above. Therefore, since the forming material having undergone the forming step is subjected to the irradiation step, formed products that have various shapes and that have excellent mechanical characteristics can be obtained.

The forming step is preferably carried out by extrusion or injection molding. The PTFE to be used in the manufacturing method has melt fluidity and does not have fibrillatability. Therefore, extrusion or injection molding can be suitably performed, and PTFE formed products having various shapes can be efficiently obtained.

Preferably, the forming step is carried out by coating with the forming material, and the forming material to be subjected to the coating is powder or an aqueous dispersion. The PTFE to be used in the manufacturing method has melt fluidity and does not have fibrillatability, and thus coating with the PTFE can be performed by powder application, or the PTFE can be applied as an aqueous dispersion. In this case, a PTFE formed product can be efficiently obtained as a coating film.

The number average molecular weight of the PTFE is preferably not greater than 600 thousand. When such a low-molecular weight PTFE is used, a PTFE formed product having more excellent mechanical characteristics can be obtained.

A PTFE formed product according to an aspect of the present invention is a PTFE formed product obtained by the manufacturing method for the PTFE formed product. The PTFE formed product has excellent mechanical characteristics such as wear resistance and thus can be suitably used for a sliding member and the like.

Here, the "principal component" means a component contained in the largest amount, for example, a component contained in an amount of not less than 50 mass %.

[Details of Embodiment of Present Invention]

Hereinafter, a manufacturing method for a PTFE formed product and a PTFE formed product according to an embodiment of the present invention will be described in detail.

<Manufacturing Method for PTFE Formed Product>

The manufacturing method for the PTFE formed product according to the embodiment of the present invention includes an irradiation step of irradiating a forming material containing a PTFE as a principal component with ionizing radiation under a condition of no oxygen and of a temperature equal to or higher than the crystalline melting point of the PTFE, and the PTFE has a melt viscosity at 380° C. of not greater than $7\times10^5$ Pa·s.

According to the manufacturing method, a PTFE formed product having excellent mechanical characteristics such as wear resistance can be obtained by irradiating a forming material containing, as a principal component, a PTFE having a low melt viscosity, that is, having a low molecular weight, with ionizing radiation. The reason for this is uncertain, but it is speculated that: by using a PTFE having relatively short molecular chains, a crosslinked structure in which the molecular chains are intricately entangled with each other is formed during crosslinked structure formation by irradiation with ionizing radiation; and the mechanical strength further improves due to the intricate entanglement of the molecular chains. Also since no difference from the case of using a high-molecular weight PTFE is observed in an NMR spectrum of the obtained PTFE formed product, the crosslinked structure and the crosslink density are similar to those in the case, but it is speculated that a difference in entanglement of molecular chains from the case is produced.

The manufacturing method uses the low-molecular weight PTFE, which has melt fluidity and does not have fibrillatability, thus facilitates forming, and which can increase the productivity of a PTFE formed product.

(Forming Material)

The forming material contains the PTFE as a principal component. The form of the PTFE is not particularly limited, but can normally be particles. The form of the forming material may be powder, a solution, a dispersion (slurry), or the like, but is not particularly limited.

The PTFE maybe a homo PTFE or may be a modified PTFE. The homo PTFE refers to a homopolymer of tetrafluoroethylene. The modified PTFE refers to a copolymer of tetrafluoroethylene and a monomer other than tetrafluoroethylene (also referred to as "modified monomer". The upper limit of the content of a structural unit derived from the modified monomer in the modified PTFE is preferably 1 mass % and more preferably 0.5 mass %. As the modified monomer, a publicly known monomer can be used, and one type may be used, or two or more types may be used.

A manufacturing method for the PTFE is not particularly limited. For example, a PTFE having a desired melt viscosity can be suitably obtained by publicly known emulsion polymerization or the like. Specifically, the emulsion polymerization can be carried out by performing emulsion polymerization of tetrafluoroethylene (TFE) in the presence of an aqueous dispersion medium, a surfactant, and a radical polymerization initiator. As the PTFE, a commercially available PTFE can also be used. In addition, as the PTFE, a PTFE modified such that the advantageous effects of the present invention are not impaired may be used.

The aqueous dispersion medium refers to water or a mixed dispersion medium of water and an aqueous organic dispersion medium (alcohol or the like). As the aqueous dispersion medium, water is preferable.

As the surfactant, fluorine-containing surfactants, such as perfluoroalkyl carboxylic acids and salts thereof, and fluorine-containing sulfonic acids and salts thereof, are preferable. Specific examples of the perfluoroalkyl carboxylic acids include perfluorohexanoic acid, perfluoroheptanoic acid, perfluorooctanoic acid, and perfluorononanoic acid. Specific examples of the fluorine-containing sulfonic acids include perfluorooctane sulfonic acid. Specific examples of the salts of these acids include alkali metal salts such as lithium salts, sodium salts, and potassium salts, and ammonium salts.

Examples of the radical polymerization initiator include persulfates such as ammonium persulfate and potassium persulfate, and water-soluble organic peroxides such as disuccinic acid peroxide and tert-butyl hydroperoxide.

During the polymerization, a chain transfer agent is preferably used for controlling the molecular weight (melt viscosity) of a PTFE to be obtained. For example, a PTFE having a lower molecular weight can be obtained by increasing the amount of the chain transfer agent to be used. Examples of the chain transfer agent include saturated hydrocarbons such as methane, ethane, propane, and butane, halogenated saturated hydrocarbons such as chloromethane, dichloromethane, and difluoroethane, and alcohols such as methanol and ethanol.

During the polymerization, an emulsion stabilizer such as paraffin wax, and a pH adjuster such as ammonium carbonate, can also be used as necessary.

The PTFE obtained by such emulsion polymerization or the like may be used as a dispersion or may be used as a dried powder. In the case where the PTFE is in the form of particles, the average primary particle diameter of the PTFE can be, for example, not less than 0.1 μm and not greater than 0.5 μm. The average primary particle diameter is a value measured by a method described in EXAMPLES.

The upper limit of the melt viscosity at 380° C. of the PTFE is $7 \times 10^5$ Pa·s, preferably $6 \times 10^5$ Pa·s, and more preferably $5 \times 10^5$ Pa·s. On the other hand, the lower limit of the melt viscosity at 380° C. of the PTFE is preferably $1 \times 10^2$ Pa·s, more preferably $1 \times 10^3$ Pa·s, further preferably $1 \times 10^4$ Pa·s, and particularly preferably $1 \times 10^5$ Pa·s. When the melt viscosity of the PTFE that has not been irradiated exceeds the upper limit, a formed product having excellent mechanical characteristics cannot be obtained. In addition, the PTFE having a melt viscosity exceeding the upper limit does not have favorable melt fluidity but has fibrillatability, and thus the formability deteriorates. On the other hand, when the melt viscosity is less than the lower limit, the amount of a volatile component at high temperature is increased, and thus volatilization is likely to occur during the irradiation with the ionizing radiation, baking (thermal treatment) before the irradiation, or the like, so that the mechanical characteristics of the obtained formed product tend to deteriorate. In addition, the forming material or the obtained formed product may be colored.

Hereinafter, methods for measuring the melt viscosity of the PTFE will be described.

(Method X)

The melt viscosity at 380° C. of the PTFE is a value measured by a method X described below. First, a formed product is produced as a sample by the following procedure. Three grams of a powdered PTFE is filled into a cylindrical mold having an inner diameter of 30 mm and is compressed until a final pressure becomes 30 MPa. By keeping the compression under 30 MPa for 2 minutes, a sample is obtained as a disk-shaped formed product (diameter: 30 mm, thickness: about 2 mm). The obtained sample is taken out from the mold, is cut out into a disk shape having a diameter of 27 mm, and then is held between 25 mm-diameter parallel plates of a test stand of "Rheometer MCR500" manufactured by Anton Paar. The sample is kept at 380° C. for 5 minutes while being held. Thereafter, the distance between the plates is adjusted to 1.5 mm, and a portion of the sample that protrudes from the plates is removed, and the sample is kept at 380° C. for 30 minutes until stress on the sample is sufficiently alleviated. A melt viscosity at 380° C. is measured in a vibration mode in which an amount of deformation at the measurement is 0.2% and a shear rate is 0.1 (l/s). In the case of the parallel plates, the amount of deformation at the measurement is the ratio of the vibration amplitude of the outermost peripheries of the parallel plates relative to the sample thickness.

(Method Y)

The melt viscosity of the PTFE can also be measured by a method Y described below. Also in EXAMPLES, it is shown that a value measured by the method X and a value measured by the method Y are substantially equal to each other (see a PTFE powder A in Table 1).

The method Y is a measurement method that conforms to ASTM D 1238. Specifically, measurement can be performed, by using a 2φ-8L die and a flow tester manufactured by Shimadzu Corporation, while 2 g of a sample that has been preheated at a measurement temperature (380° C.) for 5 minutes, is kept at this temperature under a load of 0.7 MPa.

(Method Z)

Meanwhile, the melt viscosity of a high-molecular weight PTFE that does not flow in a molten state can be obtained by a method Z in which a melt viscosity is obtained from elongation (creep) in a molten state by thermomechanical analysis (TMA) described below. Specifically, a (specific) melt viscosity can be obtained by carrying out a creep test by the following procedure using a solid viscoelasticity spectrometer ("EXSTAR 6000DMS" manufactured by SII Nano Technology Inc.).

First, a sample is produced by the following method. Eighty grams of a powder is filled into a cylindrical mold having an inner diameter of 50 mm, and pressure is gradually applied thereto for about 30 seconds such that a final pressure becomes about 352 kg/cm². After keeping the final pressure for 2 minutes, a formed product is taken out from the mold. The obtained cylindrical formed product (diameter: 50 mm) is baked in an air electric furnace heated at 371° C., for 90 minutes, and the temperature is subsequently decreased to 250° C. at a rate of 1° C./min. After keeping 250° C. for 30 minutes, a baked body is taken out from the inside of the furnace. Next, the obtained cylindrical baked body is processed by cutting along a side surface thereof to obtain a band-shaped sheet having a thickness of 0.50 mm. A small piece having a width of 5 mm and a length of 15 mm is cut out from the obtained band-shaped sheet, the width and the thickness of the small piece are accurately measured, and a cross-sectional area of the small piece is calculated. Next, sample attachment metal fittings are attached to both ends of the small piece (sample) such that the distance therebetween is 1.0 cm. Furthermore, the metal-sample assembly is put into a cylindrical furnace, and the temperature is increased from room temperature to 380° C. at a rate of 20° C./min. After keeping the temperature for about 5 minutes, a load of about 15 g is applied to the sample. From a curve of elongation change over time, an elongation between 60 minutes to 120 minutes after the load application is read, and the ratio of the elongation relative to the time (60 min) is obtained. A (specific) melt viscosity (η) can be calculated from the following relational expression.

$$\eta = \frac{W \times Lr \times g}{3 \times (dLr/dT) \times Ar}$$ [Math. 1]

In the above expression, W represents a tensile load (g), Lr represents the length (cm) of the sample at 380° C., "g" represents the constant of gravity (980 cm/sec$^2$), dLr/dT represents the ratio (cm/sec) of the elongation between 60 minutes and 120 minutes relative to the time, and Ar represents the cross-sectional area (cm$^2$) of the sample at 380° C. Here, Lr/Ar can be calculated from a measurement of separately obtained thermal expansion by using the following equation.

Lr/Ar=0.80×L(length at room temperature)/A(cross-sectional area at room temperature)

The aforementioned PTFE having a melt viscosity of not greater than 7×10$^5$ Pa·s is a PTFE having a low molecular weight (a low-molecular weight PTFE). The number average molecular weight of the PTFE is preferably not greater than 600 thousand. On the other hand, the lower limit of the number average molecular weight of the PTFE can be, for example, 10 thousand. The number average molecular weight of the PTFE is a value measured according to the method of S. Wu (Polymer Engineering & Science, 1988, Vol. 28, 538, and 1989, Vol. 29, 273).

The low-molecular weight PTFE has a feature of not having fibrillatability, due to its low molecular weight. Presence/absence of fibrillatability of a PTFE can be determined by performing paste extrusion. The reason why paste extrusion is possible is that, normally, a high-molecular weight PTFE has fibrillatability. When an unbaked formed product obtained by paste extrusion does not have substantial strength or elongation, for example, when the elongation is 0% and the formed product is broken if being pulled, fibrillatability can be considered to be absent.

The lower limit of the contained amount of the PTFE in the solid content (nonvolatile component) in the forming material to be subjected to the irradiation step is preferably 50 mass % and more preferably 55 mass %. In addition, the lower limit may be 60 mass %, may be 80 mass %, or may be 90 mass %. When the contained amount of the PTFE in the forming material is less than the lower limit, the obtained PTFE formed product cannot exhibit excellent mechanical characteristics in some cases. On the other hand, the upper limit of the contained amount of the PTFE in the solid content (nonvolatile component) in the forming material may be 100 mass %, but may be 90 mass %, may be 80 mass %, or may be 70 mass %. In addition, when the forming material to be subjected to the irradiation step is a dispersion or a solution, the contained amount of the PTFE can be, for example, not less than 10 mass % and not greater than 60 mass %.

The lower limit of the contained amount of the PTFE in the entire polymer component in the forming material to be subjected to the irradiation step is preferably 50 mass %, more preferably 70 mass %, and further preferably 90 mass %. When the contained amount of the PTFE in the entire polymer component is not less than the lower limit, a PTFE formed product having more excellent mechanical characteristics can be obtained. On the other hand, the upper limit of the contained amount of the PTFE in the entire polymer component may be 100 mass % or may be 90 mass %.

Examples of components that may be contained in the forming material in addition to the PTFE include another polymer component, a surfactant, a film forming aid, an antifoaming agent, a filler, a pigment, and a flame retardant. Examples of the filler include carbon, graphite, glass fiber, and super engineering plastics. In addition, the forming material in a state of a dispersion contains water as a dispersion medium, a surfactant, etc. The water, the surfactant, etc. all substantially volatilize during baking (heating).

(Forming Step)

The manufacturing method for the PTFE formed product preferably includes a forming step of forming the forming material, before the irradiation step. That is, the forming material is preferably subjected to the irradiation step after being formed into a desired shape. The PTFE to be used in the manufacturing method has excellent formability as described above. Therefore, since the forming material having undergone the forming step is subjected to the irradiation step, formed products that have excellent mechanical characteristics and that have various shapes can be obtained.

The forming step can be carried out by extrusion or injection molding. By carrying out the forming by extrusion or injection molding, forming into a desired sliding member or the like can be easily performed. The extrusion may be paste extrusion, but is preferably melt extrusion. With a low-molecular weight PTFE that does not have fibrillatability (a PTFE having a melt viscosity at 380° C. of not greater than 7×10$^5$ Pa·s), paste extrusion becomes difficult in some cases. On the other hand, the low-molecular weight PTFE has melt fluidity in a temperature range equal to or higher than the melting point thereof. Therefore, favorable forming can be carried out even by melt extrusion or injection molding. The extrusion or the injection molding can be carried out by publicly known methods.

The forming step can also be carried out by coating with the forming material. At this time, the forming material (PTFE) to be subjected to the coating is preferably powder or an aqueous dispersion. By the forming carried out by the coating, a film-shaped formed product can be obtained. Since the low-molecular weight PTFE does not have fibrillatability as described above, the forming material can also be effectively used as a powder coating material. The coating can be carried out by publicly known methods.

After the coating with the forming material, a coating film to be subjected to the irradiation step can be obtained by heating (baking) the forming material. The heating temperature after the coating can be, for example, not lower than 360° C. and not higher than 420° C. In addition, the heating time can be, for example, not shorter than 10 minutes and not longer than 1 hour.

(Irradiation Step)

The irradiation with the ionizing radiation is carried out substantially in the absence of oxygen, in order to prevent oxidation during the irradiation. Specifically, the irradiation with the ionizing radiation can be carried out in a vacuum (5.0E-4 Torr or less) or in an inert gas atmosphere such as nitrogen (oxygen concentration: 100 ppm or less).

The irradiation with the ionizing radiation is carried out after the PTFE is heated to a temperature equal to or higher than the crystalline melting point of the PTFE. Accordingly, molecular movement of the molecular chains become active, and thus efficient crosslinking reaction can be caused. The crystalline melting point of the PTFE depends on the molecular weight thereof and the like, and is, for example, not lower than 320° C. and not higher than 340° C. Therefore, the heating temperature can be, for example, not lower than 320° C. and not higher than 360° C.

Examples of the ionizing radiation to be applied include electron beams, gamma rays, X rays, neutron rays, and high energy ions.

The lower limit of the dose of the ionizing radiation to be applied is preferably 10 kGy, more preferably 30 kGy, and further preferably 50 kGy. On the other hand, the upper limit of the dose of the ionizing radiation to be applied is preferably 2000 kGy, more preferably 1000 kGy, further preferably 400 kGy, much further preferably 200 kGy, and particularly preferably 125 kGy. When the dose is less than the lower limit, sufficient crosslinking reaction does not proceed, and thus a formed product having excellent mechanical characteristics such as wear resistance cannot be obtained in some cases. On the other hand, when the dose exceeds the upper limit, the productivity decreases and the mechanical characteristics of the obtained formed product also deteriorate in some cases.

<PTFE Formed Product>

The PTFE formed product according to the embodiment of the present invention is a PTFE formed product obtained by the aforementioned manufacturing method for the PTFE formed product. The PTFE formed product is formed by crosslinking the low-molecular weight PTFE by the ionizing radiation and thus has excellent mechanical characteristics.

The lower limit of a PV limit measured under a constant speed condition for the PTFE formed product is preferably 700 MPa·m/min, more preferably 1000 MPa·m/min, and further preferably 1300 MPa·m/min. Furthermore, the lower limit of the PV limit is preferably 1600 MPa·m/min, more preferably 1700 MPa·m/min, further preferably 1800 MPa·m/min, and particularly preferably 1900 MPa·m/min. On the other hand, the upper limit of the PV limit is preferably 2500 MPa·m/min, more preferably 2200 MPa·m/min, and further preferably 2000 MPa·m/min. The "PV limit" is a value measured according to the A method (ring-on-disk type thrust abrasion test) in JIS-K-7218 (1986) except for using a ring having an outer diameter of 11.6 mm and an inner diameter of 7.4 mm as a mating material.

Since the PTFE formed product has a PV limit not less than the lower limit, the PTFE formed product has high wear resistance. Thus, the PTFE formed product can be suitably used as a sliding member and the like. On the other hand, when the PV limit of the PTFE formed product exceeds the upper limit, the productivity by the irradiation of the material containing the PTFE with the ionizing radiation may decrease.

The pencil hardness of the PTFE formed product is preferably not less than B, more preferably not less than HB, and further preferably not less than F. When the PTFE formed product has a high hardness as described above, the usefulness of the PTFE formed product as a sliding member and the like is enhanced. On the other hand, the pencil hardness may be, for example, not greater than H. When the pencil hardness of the PTFE formed product exceeds H, the productivity of such a PTFE formed product may decrease. The "pencil hardness" is a value measured according to JIS-K-5600-5-4 (1999).

The lower limit of the elongation at break (tensile elongation at break) of the PTFE formed product is preferably 20%, more preferably 60%, further preferably 100%, and particularly preferably 140%. When the elongation at break of the PTFE formed product is high as described above, the mechanical strength of the PTFE formed product is further enhanced, and thus the usefulness of the PTFE formed product as a sliding member and the like is further enhanced. On the other hand, the upper limit of the elongation at break of the PTFE formed product is, for example, 300% and preferably 250%. When the elongation at break of the PTFE formed product exceeds the upper limit, the productivity or the wear resistance or the like of such a PTFE formed product may decrease. The "elongation at break" is a value measured according to JIS-K-7161 (1994).

The lower limit of the breaking strength (tensile breaking strength) of the PTFE formed product is preferably 0.5 kg/mm$^2$. When the breaking strength of the PTFE formed product is high as described above, the mechanical strength of the PTFE formed product is further enhanced, and thus the usefulness of the PTFE formed product as a sliding member and the like is further enhanced. The "breaking strength" is a value measured according to JIS-K-7161 (1994).

The PTFE formed product has excellent mechanical characteristics such as rub resistance and the like, and thus can be suitably used as sliding members for vehicles, machine tools, home electric appliances, and the like. Examples of specific sliding members include bearings, gears, crankshafts, slide bearings, pistons, gaskets, conveyance rollers, and pressure rollers. The PTFE formed product may be provided as a cover layer in each of these sliding members, or the entireties of these sliding members may be formed from the PTFE formed product. The shape of the PTFE formed product is not particularly limited, and may be a film shape or may be a shape obtained by forming into the shape of a specific sliding member or the like, for example.

[Other Embodiments]

The embodiment disclosed herein is illustrative in all aspects and should be considered not restrictive. The scope of the present invention is not limited by the configuration of the above-described embodiment but is defined by the claims, and is intended to include meaning equivalent to the scope of the claims and all modifications within the scope.

EXAMPLES

Hereinafter, the present invention will be described in more detail by way of Examples. The present invention is not limited to the Examples. Each measurement method and evaluation method are described below.

[Solid content concentration of PTFE dispersion]

A solid content concentration was calculated by an equation: P (solid content concentration)=Z/X×100(%), on the basis of a heating residue Z (g) obtained by heating X (g) of an aqueous dispersion at 150° C. for 3 hours.

[Average Primary Particle Diameter]

A calibration curve of: a transmittance of projected light having a wavelength of 550 nm through an aqueous dispersion having a polymer concentration adjusted to 0.22 mass %, relative to unit length; and an average primary particle diameter determined by measuring a diameter in a fixed direction in a transmission electron micrograph, was created. For an aqueous dispersion to be measured, the transmittance was measured, and an average primary particle diameter was obtained on the basis of the calibration curve.

[Fibrillatability]

Fibrillatability was evaluated according to ASTM D 4895. Specifically, the evaluation is as follows. Fifty grams of a PTFE powder and 10.25 g of hydrocarbon oil ("Isopar G" (registered trademark) manufactured by Exxon), which is an extrusion aid, were mixed in a glass bottle for 3 minutes and aged at room temperature (25±2° C.) for 1 hour. Next, the obtained mixture was filled into an extrusion die (having a draw angle of 30° and provided with an orifice (orifice diameter: 2.54 mm, orifice length: 2 mm) at a lower end thereof) with a cylinder (inner diameter: 25.4 mm), a load of 1.2 MPa was applied to a piston inserted into the cylinder, and this state was kept for 1 minute. Thereafter the mixture was immediately extruded through the orifice at a ram speed of 20 mm/min at room temperature. When a continuous strand was obtained and the obtained unbaked formed product has strength, fibrillatability was evaluated to be present. When a continuous strand was not obtained or when a continuous strand was obtained but did not have substantial strength or elongation (for example, the elongation of the strand was 0% and the strand was broken if being pulled), fibrillatability was evaluated to be absent.

[Standard Specific Gravity (SSG)]

The standard specific gravity was measured according to ASTM D 4895.

[Melting Point and Heat of Crystallization]

A first melting point, heat of crystallization, and a second melting point were measured by differential scanning calorimetry. A differential scanning calorimeter ("X-DSC7000" manufactured by SII Nano Technology Inc.) that was calibrated for temperature by using indium and lead as standard samples in advance was used. About 3 mg of a PTFE was put into an aluminum pan (crimp container), the temperature was increased in nitrogen stream of 40 ml/min at a temperature increasing rate of 10° C./min in a temperature range of 230 to 380° C., and the minimum point of a melt peak in the above range was regarded as the first melting point. Next, the temperature was decreased at a cooling rate of 10° C./min in a temperature range of 380 to 230° C., and heat of crystallization in the range was measured. Furthermore, after the temperature was decreased to 230° C., the temperature was increased at a temperature increasing rate of 10° C./min in the temperature range of 230 to 380° C. again, and the minimum point of a melt peak in the range was regarded as the second melting point.

[Melt Viscosity]

Melt viscosities were measured by the method X, the method Y, and the method Z described above in the embodiment.

Polymerization Example 1

A PTFE aqueous dispersion A (PTFE solid content concentration: 25.0 mass %, average primary particle diameter: 0.22 μm) was obtained in the same manner as in Preparation Example 2 in Japanese Laid-Open Patent Publication No. H8-339809 except that the amount of ethane added as a chain transfer agent was 0.22 g. Next, nitric acid was added to the PTFE aqueous dispersion A, and coagulation was caused by applying intense mechanical shearing force, to obtain a powder in a wet state. The obtained powder in the wet state was separated by filtration, washed afresh with purified water, and dried at 150° C., thereby obtaining a PTFE powder A.

Production Example 1

To the PTFE aqueous dispersion A, 18 parts by mass of a nonionic surfactant (clouding point: 63° C.) per 100 parts by mass of the PTFE solid content was added, and the mixture was allowed to stand under normal pressure at 64° C. for 15 hours. Thereafter, the aqueous dispersion was concentrated by removing the supernatant such that the PTFE solid content was 65 mass %. To the concentrated aqueous dispersion, the following compounds "a" to "g" were added such that the following composition was achieved per 100 parts by mass of the PTFE solid content.

a: nonionic surfactant (HLB: 13.3), 13.5 parts by mass
    b: nonionic surfactant (HLB: 9.5), 2.5 parts by mass
    c: acrylic emulsion, 30.0 parts by mass
    d: alkaline surfactant, 2.1 parts by mass
    e: ammonium octanoate, 2.0 parts by mass
    f: film forming aid containing glycerin as a principal component, 13.8 parts by mass
    g: antifoaming agent containing paraffin-based mixture as a principal component, 4.4 parts by mass Furthermore, deionized water was added such that the solid content of the PTFE was adjusted to 44.5 mass %, to obtain a coating material A (forming material) containing the PTFE as a principal component.

Polymerization Example 2

A PTFE aqueous dispersion B (PTFE solid content concentration: 25.0 mass %, average primary particle diameter: 0.28 μm) was obtained in the same manner as in Preparation Example 2 in Japanese Laid-Open Patent Publication No. H8-339809 except that the amount of ethane added as a chain transfer agent was 0.05 g. Furthermore, a PTFE powder B was obtained by performing the same operation as in Polymerization Example 1.

Production Example 2

A coating material B containing the PTFE as a principal component was obtained, using the PTFE aqueous dispersion B, in the same manner as in Production Example 1.

Polymerization Example 3

A PTFE aqueous dispersion C (PTFE solid content concentration: 24.3 mass %, average primary particle diameter: 0.28 μm) was obtained in the same manner as in Polymerization Example 1 in Japanese Translation of PCT International Application No. 2013-528663 except that the amount of ammonium persulfate added as an initiator was 20 mg and the amount of disuccinic acid peroxide added as an initiator was 630 mg. Furthermore, a PTFE powder C was obtained by performing the same operation as in Polymerization Example 1.

Production Example 3

A coating material C containing the PTFE as a principal component was obtained, using the PTFE aqueous dispersion C, in the same manner as in Production Example 1.

Polymerization Example 4

A PTFE aqueous dispersion D (PTFE solid content concentration: 24.3 mass %, average primary particle diameter: 0.28 μm) was obtained in the same manner as in Polymerization Example 1 in Japanese Translation of PCT International Application No. 2013-528663 except that the amount of disuccinic acid peroxide added as an initiator was 840 mg. Furthermore, a PTFE powder D was obtained by performing the same operation as in Polymerization Example 1.

Production Example 4

A coating material D containing the PTFE as a principal component was obtained, using the PTFE aqueous dispersion D, in the same manner as in Production Example 1.

Polymerization Example 5

A PTFE aqueous dispersion E (PTFE solid content concentration: 24.3 mass %, average primary particle diameter: 0.30 μm) was obtained in the same manner as in Polymerization Example 1 in Japanese Translation of PCT International Application No. 2013-528663 except that the amount of disuccinic acid peroxide added as an initiator was 204 mg. Furthermore, a PTFE powder E was obtained by performing the same operation as in Polymerization Example 1.

Production Example 5

A coating material E containing the PTFE as a principal component was obtained, using the PTFE aqueous dispersion E, in the same manner as in Production Example 1.

as in Example 2 in the description of International Publication No. WO2007/119829. Furthermore, a PTFE powder G was obtained by performing the same operation as in Polymerization Example 1.

Production Example 7

A coating material G containing the PTFE as a principal component was obtained, using the PTFE aqueous dispersion G, in the same manner as in Production Example 1.

[Physical Properties of PTFEs]

For each of the obtained PTFE powders A to G, the fibrillatability, the SSG, the melting points, the heat of crystallization, and the melt viscosities were evaluated or measured. Table 1 shows the results.

TABLE 1

| Measurement items | Unit | PTFE powder A | PTFE powder B | PTFE powder C | PTFE powder D | PTFE powder E | PTFE powder F | PTFE powder G |
|---|---|---|---|---|---|---|---|---|
| Fibrillatability | — | Absence | Absence | Presence | Presence | Presence | Presence | Presence |
| SSG | — | Unmeasurable *1 | Unmeasurable *1 | 2.207 | 2.199 | 2.170 | 2.160 | 2.154 |
| First melting point | °C. | 327.2 | 329.7 | 336.0 | 337.7 | 338.4 | 344.3 | 344.3 |
| Heat of crystallization | mJ/mg | 72.1 | 65.5 | 32.6 | 29.1 | 27.4 | 26.1 | 25.8 |
| Second melting point | °C. | 328.6 | 329.2 | 327.0 | 327.2 | 326.4 | 326.5 | 326.1 |
| Melt viscosity (method X) | Pa·s | $2.7 \times 10^4$ | $3.8 \times 10^5$ | Unmeasurable *2 | Unmeasurable *2 | Unmeasurable *2 | Unmeasurable *2 | Unmeasurable *2 |
| Melt viscosity (method Y) | Pa·s | $2.7 \times 10^4$ | Unmeasurable *3 | Unmeasurable *3 | Unmeasurable *3 | Unmeasurable *3 | Unmeasurable *3 | Unmeasurable *3 |
| Melt viscosity (method Z) | Pa·s | Unmeasurable *1 | Unmeasurable *1 | $5.2 \times 10^{10}$ | $6.7 \times 10^{10}$ | $9.1 \times 10^{10}$ | $1.2 \times 10^{11}$ | $1.4 \times 10^{11}$ |

*1 In the process of producing a specimen to be measured, PTFE flowed in a molten state during baking, and a formed product shape could not be retained.
*2 The melt viscosity was high and slip occurred between a plate and the sample, so that the measurement was impossible.
*3 The melt viscosity was high and exceeded the measurement upper limit at a flow tester, so that the measurement was impossible.

Polymerization Example 6

A PTFE aqueous dispersion F (PTFE solid content concentration: 25.9 mass %, average primary particle diameter: 0.32 μm) was obtained in the same manner as in Comparative Example 3 in the description of International Publication No. WO2005/061567. Furthermore, a PTFE powder F was obtained by performing the same operation as in Polymerization Example 1.

Production Example 6

A coating material F containing the PTFE as a principal component was obtained, using the PTFE aqueous dispersion F, in the same manner as in Production Example 1.

Polymerization Example 7

A PTFE aqueous dispersion G (PTFE solid content concentration: 33.2 mass %) was obtained in the same manner Examples 1 to 8 and Comparative Examples PTFE films were obtained as PTFE formed products by the following procedure using the obtained coating materials A to G (PTFE forming materials). An etched aluminum plate having a diameter of 360 mm and a thickness of 1.2 mm was prepared as a base material. Each obtained coating material was applied to a surface of the base material by spraying. After the application, the coating film was baked at 390° C. for 30 minutes by using a thermoregulated bath. The thickness of the baked coating film was within the range of 40 to 50 μm. An electron beam was applied as ionizing radiation to the baked coating film in a nitrogen atmosphere (oxygen concentration: 5 ppm or less) at 340° C. The electron beam was accelerated to 1.03 MeV and applied by electron beam accelerator "Sagatron" manufactured by NHV Corporation. The electron beam was applied at each of doses of 50 kGy, 100 kGy, 150 kGy, 300 kGy, and 1000 kGy. In addition, formed products were obtained without irradiation (dose: 0 kGy). Accordingly, PTFE formed products of formed product Nos. 1 to 4 and 7 to 26 shown in Table 2 were obtained.

Formed product Nos. 2 to 4 and 8 to 12 correspond to Examples 1 to 8, respectively, and the other formed products are Comparative Examples.

Example 9

A PTFE film was obtained as a PTFE formed product by the following procedure using a PTFE powder P-1 ("Ruburon L-2" manufactured by Daikin Industries, Ltd.) as a powdered coating material P-1 (forming material). An etched aluminum plate having a diameter of 360 mm and a thickness of 1.2 mm was prepared as a base material. Seven grams of the coating material P-1 was applied to a surface of the base material by using a powder coating machine. After the application, the coating film was baked at 390° C. for 30 minutes by using a thermoregulated bath. The thickness of the baked coating film was within the range of 31 to 46 μm. An electron beam was applied as ionizing radiation at 300 kGy to the baked coating film in a nitrogen atmosphere (oxygen concentration: 5 ppm or less) at 340° C., to obtain a PTFE film as a PTFE formed product. The electron beam was accelerated to 1.03 MeV and applied by electron beam accelerator "Sagatron" manufactured by NHV Corporation. Example 9 corresponds to formed product No. 5 in Table 2.

The melt viscosity of the PTFE powder P-1 was measured by the above method Y. The melt viscosity of the PTFE powder P-1 was $6.3 \times 10^4$ Pa·s.

Example 10

A PTFE film was obtained as a PTFE formed product by the following procedure using a PTFE powder P-2 ("Ruburon L-5" manufactured by Daikin Industries, Ltd.) as a powdered coating material P-2 (forming material). An etched aluminum plate having a diameter of 360 mm and a thickness of 1.2 mm was prepared as a base material. Seven grams of the coating material P-2 was applied to a surface of the base material by using a powder coating machine. After the application, the coating film was baked at 390° C. for 30 minutes by using a thermoregulated bath. The thickness of the baked coating film was within the range of 36 to 47 μm. An electron beam was applied as ionizing radiation at 300 kGy to the baked coating film in a nitrogen atmosphere (oxygen concentration: 5 ppm or less) at 340° C., to obtain a PTFE film as a PTFE formed product. The electron beam was accelerated to 1.03 MeV and applied by electron beam accelerator "Sagatron" manufactured by NHV Corporation. Example 10 corresponds to formed product No. 6 in Table 2.

The melt viscosity of the PTFE powder P-2 was measured by the above method Y. The melt viscosity of the PTFE powder P-2 was $2.9 \times 10^4$ Pa·s.

[Evaluation]

Each of the obtained PTFE films (PTFE formed products) were evaluated as described below. Table 2 shows the evaluation results. In Table 2, "-" indicates that a PTFE formed product was not produced or not evaluated.

[PV Limit]

A PV limit was measured according to the A method (ring-on-disk type thrust abrasion test) in JIS-K-7218 (1986) (the ring dimensions are as follows). The other conditions are as follows:

Ring-shaped mating member material: S45C,
Ring dimensions: outer diameter 11.6 mm, inner diameter 7.4 mm,
Ring-shaped mating member surface roughness: Ra 0.28 μm,
Testing device: "EFM-III 1010" manufactured by A&D Company, Limited,
Dry (no oil),
Constant speed test (25 m/min).

The film was rotated for 10 minutes under each pressure, and the pressure was increased if the film was not broken. The speed was constantly set to 25 m/min. The pressure was increased to 1 MPa, 5 MPa, and 10 MPa stepwise, and was increased in steps of 10 MPa after reaching 10 MPa. The pressure previous to the pressure at which the film was broken was regarded as a limit pressure, and the product of the limit pressure and the speed (25 m/min) was defined as a PV limit. When the PV limit is not less than 750 MPa·m/min, the rub resistance can be determined to be excellent.

[Breaking Strength (Tensile Breaking Strength) and Elongation at Break (Tensile Elongation at Break)]

A breaking strength and an elongation at break were measured according to JIS-K-7161 (1994) by using a tensile compression testing machine ("SV5120MOV" manufactured by Imada Seisakusho Co., Ltd.). The measurement was performed at a tensile rate of 30 mm/min at an inter-chuck distance of 30 mm with a sample width of 10 mm. When the breaking strength is not less than 1.3 kg/mm² and the elongation at break is not less than 28%, the tensile strength can be determined to be excellent.

[Pencil Hardness]

A pencil hardness was measured according to JIS-K-5600-5-4 (1999). For example, "H to F" indicates that the hardness was an intermediate hardness between H and F. When the pencil hardness is not less than B, the hardness can be determined to be high.

TABLE 2

| Formed product No. | Coating material (forming material) | Electron beam dose | PV limit (MPa · m/min) | Tensile strength Breaking strength (kg/mm²) | Tensile strength Elongation at break (%) | Pencil hardness Measured value |
|---|---|---|---|---|---|---|
| 1 | A | 0 kGy | — | 1.4 | 11 | >5B |
| — |  | 50 kGy | — | — | — | — |
| — |  | 100 kGy | — | — | — | — |
| 2 |  | 150 kGy | 750 | 1.3 | 84 | B |
| 3 |  | 300 kGy | 1375 | 1.4 | 64 | B |
| 4 |  | 1000 kGy | 1000 | 1.6 | 28 | B |
| — | P-1 (powder) | 0 kGy | — | — | — | — |
| — |  | 50 kGy | — | — | — | — |
| — |  | 100 kGy | — | — | — | — |
| — |  | 150 kGy | — | — | — | — |
| 5 |  | 300 kGy | 1125 | — | — | B |

TABLE 2-continued

| Formed product No. | Coating material (forming material) | Electron beam dose | PV limit (MPa·m/min) | Breaking strength (kg/mm$^2$) | Elongation at break (%) | Pencil hardness Measured value |
|---|---|---|---|---|---|---|
| — |  | 1000 kGy | — | — | — | — |
| — | P-2 (powder) | 0 kGy | — | — | — | — |
| — |  | 50 kGy | — | — | — | — |
| — |  | 100 kGy | — | — | — | — |
| — |  | 150 kGy | — | — | — | — |
| 6 |  | 300 kGy | 1375 | 1.3 | 13 | B |
| — |  | 1000 kGy | — | — | — | — |
| 7 | B | 0 kGy | <25 | 0.8 | 14 | >5B |
| 8 |  | 50 kGy | 1950 | 1.4 | 192 | F |
| 9 |  | 100 kGy | 1950 | 1.5 | 158 | F |
| 10 |  | 150 kGy | 1500 | 1.5 | 272 | F |
| 11 |  | 300 kGy | 1125 | 1.4 | 49 | F to HB |
| 12 |  | 1000 kGy | 1250 | 1.8 | 86 | B |
| 13 | C | 0 kGy | — | 1.9 | 207 | HB |
| — |  | 50 kGy | — | — | — | — |
| — |  | 100 kGy | — | — | — | — |
| 14 |  | 150 kGy | 1125 | 1.4 | 53 | H |
| — |  | 300 kGy | — | — | — | — |
| 15 |  | 1000 kGy | 1375 | 1.7 | 31 | HB |
| 16 | D | 0 kGy | — | 2 | 289 | HB |
| — |  | 50 kGy | — | — | — | — |
| — |  | 100 kGy | — | — | — | — |
| — |  | 150 kGy | — | — | — | — |
| 17 |  | 300 kGy | 1000 | 1.5 | 56 | HB |
| 18 |  | 1000 kGy | 1125 | 1.8 | 34 | HB |
| 19 | E | 0 kGy | <25 | 1.9 | 221 | F to HB |
| 20 |  | 50 kGy | 1250 | 1.4 | 59 | F |
| 21 |  | 100 kGy | 1250 | 1.4 | 53 | HB |
| 22 |  | 150 kGy | 1375 | 1.4 | 58 | HB |
| 23 |  | 300 kGy | 1125 | 1.5 | 57 | HB to B |
| 24 |  | 1000 kGy | 750 | 1.7 | 30 | HB |
| — | F | 0 kGy | — | — | — | — |
| — |  | 50 kGy | — | — | — | — |
| — |  | 100 kGy | — | — | — | — |
| — |  | 150 kGy | — | — | — | — |
| 25 |  | 300 kGy | 1125 | 1.4 | 67 | HB |
| — |  | 1000 kGy | — | — | — | — |
| — | G | 0 kGy | — | — | — | — |
| — |  | 50 kGy | — | — | — | — |
| — |  | 100 kGy | — | — | — | — |
| — |  | 150 kGy | — | — | — | — |
| 26 |  | 300 kGy | 875 | 1.5 | 28 | 2B |
| — |  | 1000 kGy | — | — | — | — |

As shown in Table 2, the formed products of formed product Nos. 2 to 4 and 8 to 12 (Examples 1 to 8) each have a high PV limit (not less than 750 MPa·m/min) and also have excellent tensile strength (the elongation at break is not less than 28%). In addition, the formed products of formed product Nos. 5 and 6 (Examples 9 and 10) can be obtained by coating with a PTFE powder and is found to be formed products having a high PV limit.

The pencil hardness is of particular interest. The high-molecular weight PTFE in a fibrillated region (the formed product No. 19) has a pencil hardness of F to HB even without irradiation (0 kGy) and thus can be used as a coating film in general use. The low-molecular weight PTFE in a non-fibrillated region such as formed product Nos. 1 and 7 has a pencil hardness of not greater than 5 B without irradiation (0 kGy). When these formed products are actually observed, these formed products easily flakes off partially if being rubbed with a nail, and cannot be considered as coating films. When these formed products were irradiated with the electron beam (formed product Nos. 2 to 4 and 8 to 12), samples having pencil hardness B or pencil hardness F harder than formed product No. 19 were observed, and it is found that these formed products became firm coating films as a result of the electron beam irradiation.

The invention claimed is:

1. A manufacturing method for a polytetrafluoroethylene formed product, the method comprising an irradiation step of irradiating a forming material containing a homopolymer of polytetrafluoroethylene as a principal component with ionizing radiation under a condition of no oxygen and of a temperature equal to or higher than a crystalline melting point of the polytetrafluoroethylene, wherein
   the homopolymer of polytetrafluoroethylene included in the forming material prior to the irradiation step has a melt viscosity at 380° C. of not greater than $7 \times 10^5$ Pa·s,
   a dose of the ionizing radiation is not less than 50 kGy and not greater than 150 kGy, and
   a pencil hardness of the polytetrafluoroethylene formed product is not less than F and the pencil hardness of the polytetrafluoroethylene formed product is not greater than H.

2. The manufacturing method for the polytetrafluoroethylene formed product according to claim 1, wherein the melt viscosity is not less than $1 \times 10^2$ Pa·s.

3. The manufacturing method for the polytetrafluoroethylene formed product according to claim 2, wherein the melt viscosity is not less than $1 \times 10^5$ Pa·s.

4. The manufacturing method for the polytetrafluoroethylene formed product according to claim 1, wherein the manufacturing method is a manufacturing method for a polytetrafluoroethylene formed product for a sliding member.

5. The manufacturing method for the polytetrafluoroethylene formed product according to claim 1, further comprising a forming step of forming the forming material, before the irradiation step.

6. The manufacturing method for the polytetrafluoroethylene formed product according to claim 5, wherein the forming step is carried out by extrusion or injection molding.

7. The manufacturing method for the polytetrafluoroethylene formed product according to claim 5, wherein the forming step is carried out by coating with the forming material which is powder or an aqueous dispersion.

8. The manufacturing method for the polytetrafluoroethylene formed product according to claim 1, wherein the polytetrafluoroethylene has a number average molecular weight of not greater than 600 thousand.

9. A polytetrafluoroethylene formed product obtained by the manufacturing method for the polytetrafluoroethylene formed product according to claim 1.

* * * * *

UNITED STATES PATENT AND TRADEMARK OFFICE
CERTIFICATE OF CORRECTION

| | |
|---|---|
| PATENT NO. | : 11,326,034 B2 |
| APPLICATION NO. | : 15/757708 |
| DATED | : May 10, 2022 |
| INVENTOR(S) | : Kazuaki Ikeda et al. |

It is certified that error appears in the above-identified patent and that said Letters Patent is hereby corrected as shown below:

On the Title Page

At (73) Assignees: "SUMITOMO ELECTRIC FINE POLYMER" should be corrected to read --SUMITOMO ELECTRIC FINE POLYMER, INC.--.

Signed and Sealed this
Fifteenth Day of November, 2022

Katherine Kelly Vidal
*Director of the United States Patent and Trademark Office*